March 27, 1951
C. F. BLOCK
2,546,719
METHOD AND APPARATUS FOR SOLDERING
Filed Jan. 5, 1950
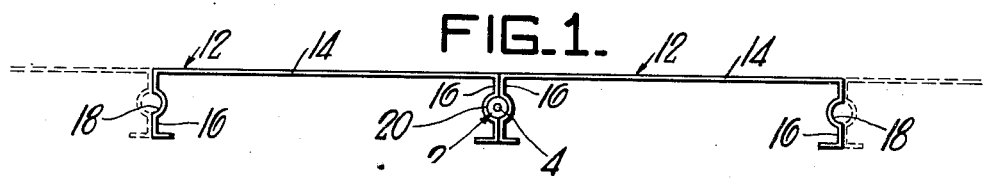
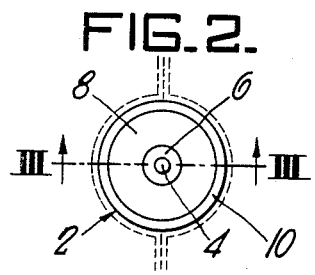
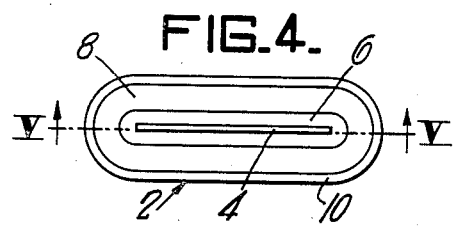
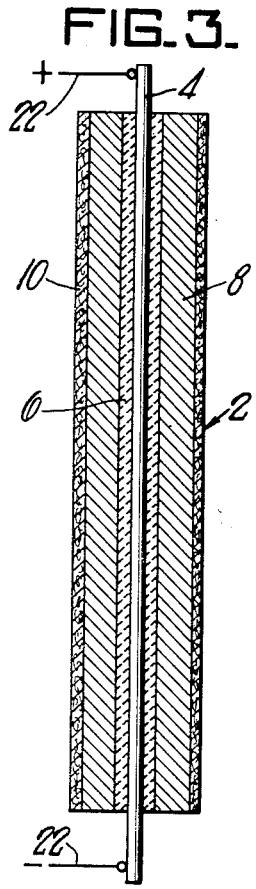
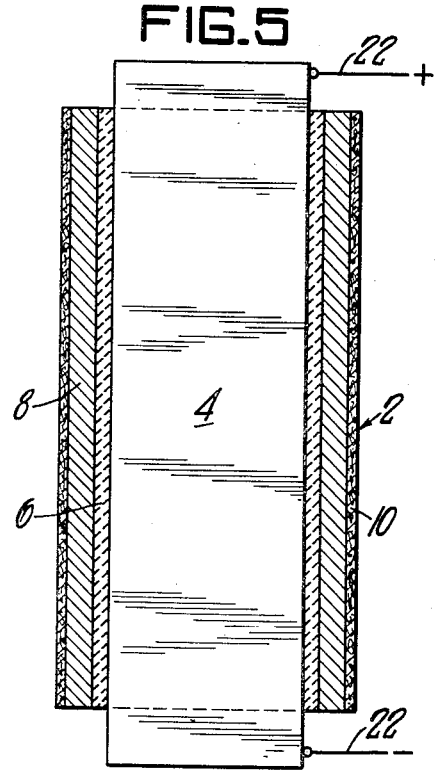
Inventor:
CARL F. BLOCK,
by: Donald G. Dalton
his Attorney.

Patented Mar. 27, 1951

2,546,719

UNITED STATES PATENT OFFICE 2,546,719

METHOD AND APPARATUS FOR SOLDERING

Carl F. Block, Pittsburgh, Pa., assignor to United States Steel Company, a corporation of New Jersey Application January 5, 1950, Serial No. 137,004

1 Claim. (Cl. 219—12)

The present invention relates to an improved means and method for joining metallic objects together and more particularly to a composite soldering device and method for the use thereof to solder metallic objects together, for example, the interconnecting of fabricated metallic panel sections for building exteriors or the like.

An object of my invention is to provide a composite device containing metallic solder, flux and electrical resistance heating means for joining metallic objects together.

Another object of my invention is to provide a method of soldering whereby a composite soldering device containing a wire core, metallic solder and flux is positioned between two metallic objects and electrical current is passed through the wire core to melt the solder and thereby join the two objects together.

These and other objects will be fully apparent from the following detailed disclosure and the appended claim when read in connection with the accompanying drawings, in which:

Figure 1 is an end view of structural panels joined together by means of the invention;

Figure 2 is an enlarged end view showing the device of the invention in use as shown in Figure 1;

Figure 3 is a longitudinal sectional view taken on the line III—III of Figure 2;

Figure 4 is an end view of a modification of the invention; and

Figure 5 is a longitudinal sectional view taken on the line V—V of Figure 4.

Referring more particularly to the drawings, reference numeral 2 indicates generally the composite soldering device of my invention. To construct the device, I use a wire 4 as a core which may be made of steel or any other metal capable of creating resistance heat when electrical current is passed therethrough. The wire 4 is coated with a layer of dielectric cement 6 to provide an insulation therearound. It will be noted that, although I prefer to thus insulate the wire core to insure optimum efficiency, the absence of insulation around the core would not be fatal to successful operation of the completed device. The coated wire 4 is surrounded with a layer of metallic solder 8 which may be ordinary lead-tin solder or any other suitable metal such as zinc, brazing material, etc. The solder 8 and the sheathed, insulated wire core 4 are covered with a loosely woven flux-impregnated inflammable fabric 10. The fabric may be impregnated with ordinary flux material such as paste rosin. The fabric itself may be linen, burlap or the like. The purpose of the fabric covering 10 is to provide a carrier for the flux and also to provide a momentary heat insulation around the solder.

In Figure 1, I have illustrated a typical use for my soldering device, i. e., the interconnecting of steel panel sections for building exteriors. Reference numeral 12 indicates a steel panel section having a porcelain enameled web portion 14 and two inwardly turned flange ends 16. Each of the flanges 16 is provided with a semicircular notch 18 running along the entire length of the panel section. The notch in each flange is positioned so as to register with the notch in the flange of an adjoining panel section to form an enclosed circular opening 20 when the sections are assembled in side-by-side relation. As the panel sections are assembled, a composite soldering device 2 of my invention is inserted into each of the openings 20 with the bare wire core 4 projecting beyond the opposite ends of the panel sections 12. After the devices 2 have been positioned, the adjoining flanges 16 of the abutting sections are temporarily clamped together.

After assembly, the projecting wires of the devices 2 are touched by wires 22 connected to a power source (not shown). The electrical resistance heat in the wire core 4 melts the solder 8 and burns away the fabric 10 so that the solder acts with the steel surfaces to be joined, filling up the openings 20 to produce a tight interconnection of the panel sections. Then the protruding ends of the wires are clipped off to neatly complete the operation.

In Figures 4 and 5, I have shown a flattened modification of my soldering device which I have found especially suitable for attaching galvanized tinned roofing or roofing sections in places where soldering by conventional methods would be difficult. It may be pointed out that my device can be made in flat, square, round or formed shapes to suit various shaped objects to be connected.

The description and drawings forming part of this specification are to be interpreted in an illustrative rather than a limiting sense since various modifications may be made by those skilled in the art without departure from the invention as defined by the appended claim.

I claim:

A method for joining metallic building panels having adjoining flanged edges comprising the steps of forming a groove in each of said flanged edges so as to define a passageway between the adjoining edges, inserting a composite soldering device including a heating wire sheathed with dielectric insulation and solder and having a flux layer thereon in said passageway, and passing electrical current through said wire to thereby create heat therein for melting said solder and soldering said panels together.

CARL F. BLOCK.

REFERENCES CITED

The following references are of record in the file of this patent:

UNITED STATES PATENTS

| Number | Name | Date |
|---|---|---|
| 1,369,919 | Eliel | Mar. 1, 1921 |
| 2,055,393 | Thomas | Sept. 22, 1936 |